United States Patent [19]

Page

[11] Patent Number: 4,924,988
[45] Date of Patent: May 15, 1990

[54] CLUTCH

[75] Inventor: Rocky H. Page, Tecumseh, Mich.

[73] Assignee: Tecumseh Products Company, Tecumseh, Mich.

[21] Appl. No.: 299,007

[22] Filed: Jan. 19, 1989

[51] Int. Cl.$^5$ .............................................. F16D 11/04
[52] U.S. Cl. .............................. 192/70.23; 192/93 A; 192/109 B; 192/56 R; 56/11.3; 56/11.7
[58] Field of Search ............... 192/70.23, 70.24, 93 A, 192/109 B, 56 R; 74/689; 56/11.3, 11.5, 11.7, 17.5, 25.3

[56] References Cited

U.S. PATENT DOCUMENTS

| | | | |
|---|---|---|---|
| 2,931,476 | 4/1960 | Zeidler et al. | 192/93 A |
| 3,127,969 | 4/1964 | Hansen | 192/109 B |
| 3,129,797 | 4/1964 | Orcutt et al. | 192/93 A |
| 3,877,253 | 4/1975 | Yeagle | 192/56 R X |
| 4,205,509 | 6/1980 | Miyazawa et al. | 56/11.3 |

OTHER PUBLICATIONS

Dana Formsprag Mechanical Clutch Brochure, MTP-004-84.
Ogura Brochure, *Brake-Clutches for Lawn Mowers*.

Primary Examiner—Randolph A. Reese
Assistant Examiner—Franco S. DeLiguori
Attorney, Agent, or Firm—Jeffers, Hoffman & Niewyk

[57] ABSTRACT

The present invention is a clutch assembly used to engage a shaft. It includes a pulley adapted to be driven by a belt, pressure plates disposed on both sides of the pulley for engaging and rotating with the pulley, friction surfaces for selectively coupling the pulley to the pressure plates, and a cam mechanism coupled to the pressure plates for axially pressing one pressure plate into the friction surfaces to engage the pulley. The cam mechanism comprises a rotatable center cam plate bordered by an upper and a lower cam plate, with a plurality of balls disposed between each adjacent plate for axially moving the center cam plate when it rotates. The center cam plate presses the pressure plate by virtue of its axial movement into engagement with the pulley.

21 Claims, 2 Drawing Sheets

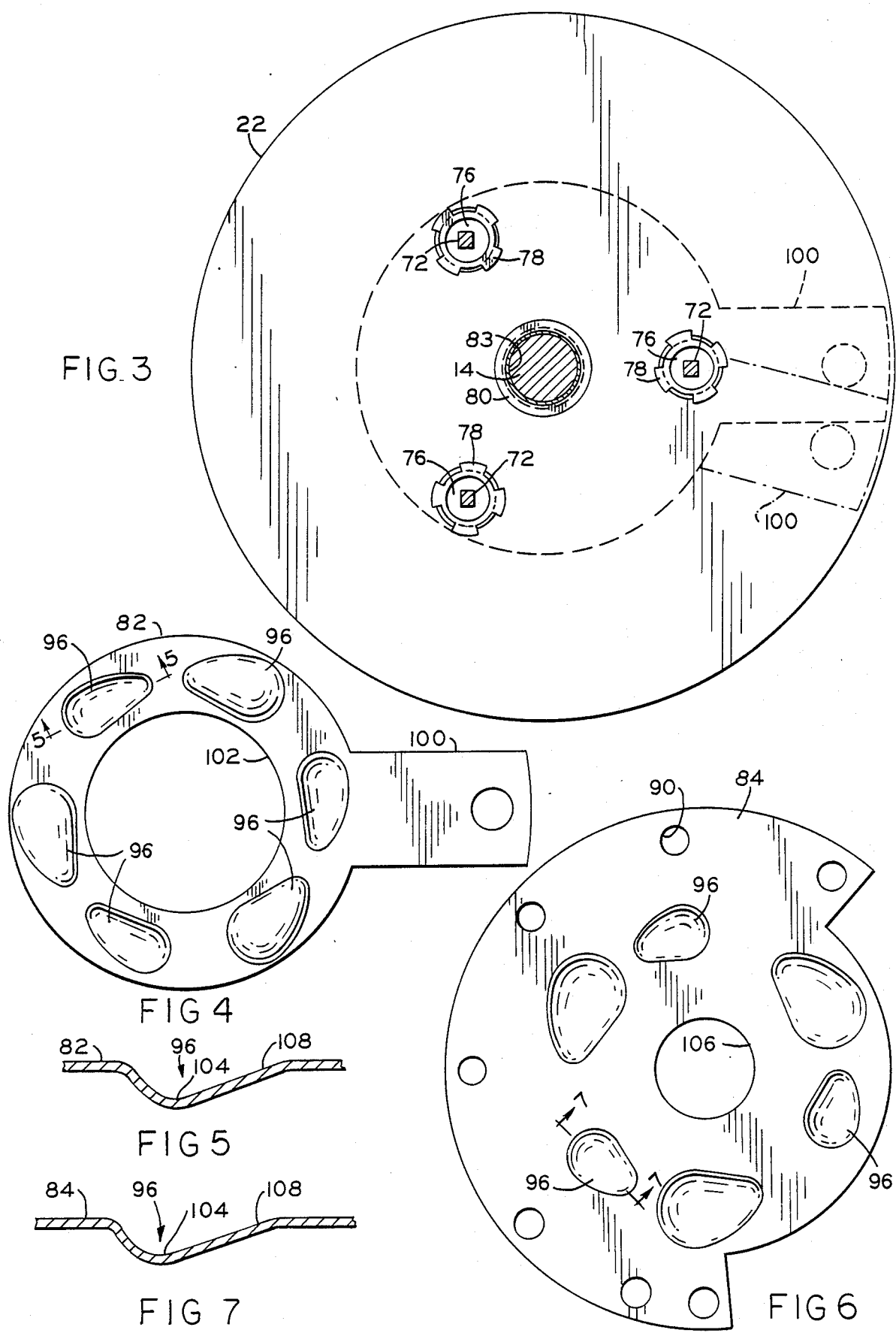

CLUTCH

BACKGROUND OF THE INVENTION

The field of the invention is that of clutches. More specifically, the field is that of clutches used with lawn and garden implements having belt transmissions.

A variety of clutch designs are well known in the art. They are characterized by their high cost and complexity, characteristics which are undesirable in many applications. Many prior art clutches do not engage smoothly and cause the vehicle to lurch on engagement. Prior art clutches having complex designs often are prone to manufacturing defects.

Belt type clutches typically operate by engaging and disengaging a belt and a pulley to transmit motion from the engine to the axle. In addition to the problem of abrupt engagement, the angle between the belt and the engaging elements must be precisely fit within a narrow range for effective operation, which further complicates manufacture. This design presents difficulty which may result in a harshly working clutch.

What is needed is a clutch which operates smoothly and which is inexpensive to produce.

SUMMARY OF THE INVENTION

The present invention is a clutch for a belt transmission. A pulley is engaged by a pressure plate being pushed by a cam mechanism. The pressure plate pushes into friction surfaces which serve to rotationally couple the pulley to the pressure plate. By this design the pressure plate transmits the torque received on the pulley to the transmission shaft.

The clutch has a pulley which receives friction pucks in a plurality of windows. These friction pucks have two friction surfaces to clutch pressure plates which are rotatably coupled to the transmission shaft. By utilizing both surfaces of the friction pucks, the pressure plates engage the pulley in a smoothly manner. Assembling the friction pucks with the pulley is simple because the pucks need only be placed within the windows.

One of the torque transmitting pressure plates is connected to the arms of a driver plate. The driver plate is fixed on the transmission shaft, but the torque transmitting plate can axially move on the shaft. The torque transmitting pressure plate is slidable on a sleeve on the shaft, the sleeve fabricated from a material that is resistant to corrosion. This helps to prevent clutch failure or lock-up.

In one embodiment, the cam mechanism comprises a rotatable center cam plate having an upper and lower cam plate disposed respectively on opposite sides. The cam plates have a plurality of balls disposed between each adajcent plate for axially moving the center cam plate when it rotates. Thus, the center cam plate presses the pressure plate into engagement by virtue of its axial movement.

BRIEF DESCRIPTION OF THE DRAWINGS

The above-mentioned and other features and objects of this invention, and the manner of attaining them, will become more apparent and the invention itself will be better understood by reference to the following description of an embodiment of the invention taken in conjunction with the accompanying drawings, wherein:

FIG. 3 is a sectional view taken along line 3—3 of FIG. 2 viewed in the direction of the arrows;

FIG. 4 is a top plan view of the center cam plate;

FIG. 5 is a sectional view taken along line 5—5 of FIG. 4 viewed in the direction of the arrows;

FIG. 6 is a bottom view of the lower cam plate; and

FIG. 7 is an inverted sectional view taken along line 7—7 of FIG. 6 viewed in the direction of the arrows.

Figure 1:
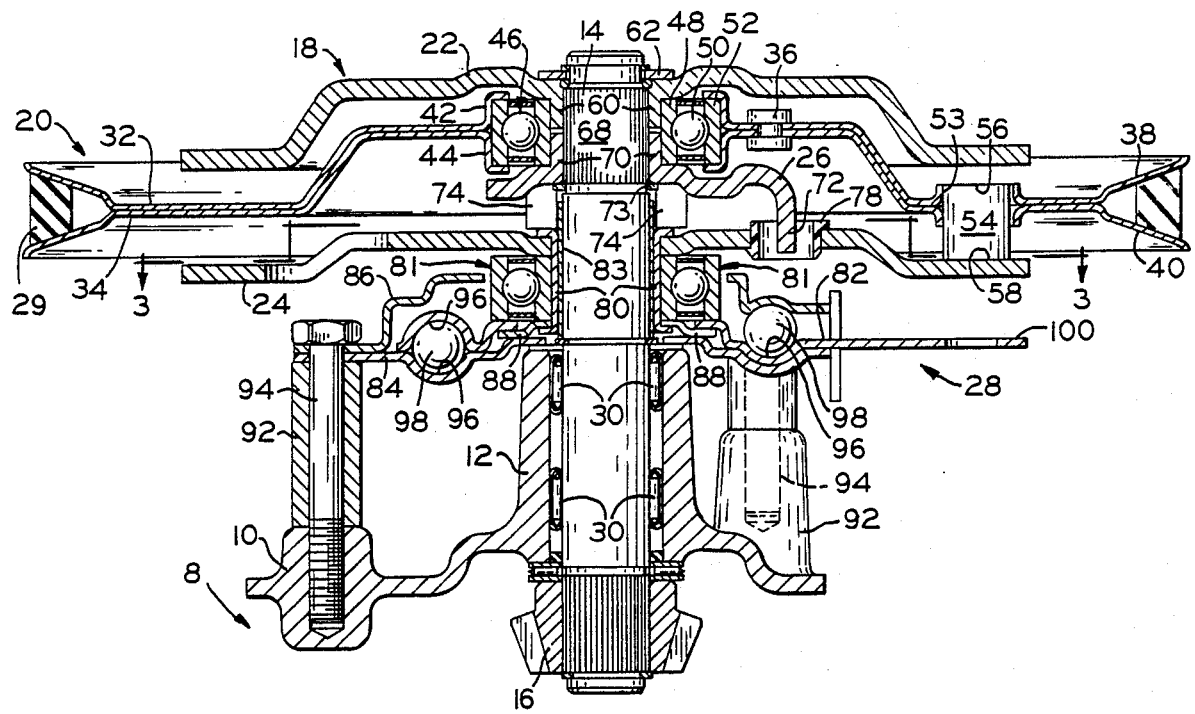
FIG. 1 is a longitudinal sectional view of the clutch mechanism of the present invention in the disengaged position.

The exemplification set out herein illustrates a preferred embodiment of the invention, in one form thereof, and such exemplifications are not to be construed as limiting the scope of this disclosure or the scope of the invention in any manner.

DETAILED DESCRIPTION OF THE PREFERRED EMBODIMENT

Clutch mechanism 18 may be mounted on a transmission 8, which has a housing 10 and a hub portion 12. Extending into transmission 8 is input shaft 14 having a bevelled pinion gear 16 to transmit its rotary motion to transmission 8. Shaft 14 is received within hub portion 12 and supported by rotational support bearings 30. A transmission compatible with the present invention is described in U.S. Pat. No. Re. 32,125, which is incorporated by reference herein.

Clutch mechanism 18 comprises input shaft 14, a pulley 20 rotatable on that shaft, pressure plates 22 and 24, driver plate 26, and cam mechanism 28. Pulley 20 receives rotary motion from a belt 29. Cam mechanism 28 manipulates lower pressure plate 24 to grip friction pucks between pressure plates 22 and 24. When engaged, pressure plates 22 and 24 are driven in unison by pulley 20.

Cam mechanism 28 is disposed around input shaft 14 directly above hub portion 12, with pressure plates 22 and 24 located above it.

Pulley 20 comprises upper and lower pulley plates 32 and 34, which are riveted together by rivets 36. Pulley 20 has two annular rim portions, upper rim portion 38 and lower rim portion 40, for accepting a belt 29. Also, pulley 20 has annular hub portions 42 and 44 which engage ball bearings 46. By this means, pulley 20 may freely rotate about input shaft 14 when the clutch is disengaged. Bearing 46 is comprised of an inner race 48, a plurality of balls 50, and an outer race 52.

Pulley plates 32 and 34 have a plurality of holes 53 in which are received friction pucks 54. In the preferred embodiment, three friction pucks 54 are used, disposed at equal distances around input shaft 14. Friction pucks 54 comprise a friction material, and have both upper and lower surfaces 56 and 58 which can frictionally engage pressure plates 22 and 24.

Upper pressure plate 22 is located atop input shaft 14 and is an annular plate with an opening in its center having a down-turned flange portion 60. Resting in a recess of input shaft 14 is snap ring and seal assembly 62 which serves to prevent upper pressure plate 60 from slipping over the top of input shaft 14. Flange portion 60 of upper pressure plate 22 is locked to the serrated or splined portion 68 of input shaft 14. The outer circumference of flange portion 60 retains bearings 46.

Driver plate 26 has an up-turned flange portion 70 which is locked to input shaft 14 on portion 68. Up-turned flange portion 70 provides a lower shoulder for bearing 46. Additionally, three downwardly extending arms 72 protrude from the outer circumference of driver plate 26. Snap ring 73 holds together the pulley subassembly. Near the inner circumference of driver plate 26, and lying on its lower face, is a resilient spacer 74, which serves to buffer driver plate 26 and lower pressure plate 24.

Lower pressure plate 24 has a plurality of holes 76 having grommets 78 disposed within (FIG. 3). Extending into each hole 76 is an arm 72 from driver plate 26. Lower pressure plate 24 is positioned within retaining sleeve 80, with plate 24 disposed around input shaft 14 and freely rotatable by virtue of retaining sleeve 80 and bearings 81.

Cam mechanism 28 comprises center cam plate 82, lower can plate 84, and upper cam plate 86. Center cam plate 82 is disposed around retaining sleeve 80 with retaining ring 88 and bearing 81. Upper and lower cam plates 86 and 84 are located above and below center cam plate 82, respectively, and have a plurality of holes 90 aligned with studs 92 of transmission housing 10. Bolts 94 fix cam plates 86 and 84 to studs 92.

All three cam plates 82, 84, and 86 have a plurality of ramping pockets or recesses 96. Ramping pockets 96 are recesses which are ramped from their shallow end 108 to their deep end 104. Balls 98 disposed in ramping pockets 96 are used to move center cam plate 82 between an engaged position (FIG. 2) to a disengaged position (FIG. 1). FIGS. 4–7 depict ramping pockets 96 of lower and center cam plates 84 and 82. There are three upwardly open equidistantly spaced and three downwardly open equidistantly spaced recesses 96 on center plate 82. Three balls are disposed on both sides of center plate 82.

Although plate 82 is generally circular in shape, actuating arm 100 extends from the outer circumference of plate 82 and center bore 102 lies in the middle of center cam plate 82.

A plurality of oval ramping pockets 96 also are provided on lower cam plate 84, shown in FIG. 6. Center bore 106 is located approximately in the center of lower cam plate 84, with oval ramping pockets 96 of lower cam plate 84 having a predetermined alignment with ramping pockets 96 of center cam plate 82. The outermost circumference of lower cam plate 84 has a plurality of holes 90 which allow it to be bolted to studs 92 of transmission housing 10. The surface of lower cam plate 84 includes cam grooves 96 each having a deep end 104 and a shallow end 108, which is shown in FIG. 7. Sleeve 80 retains the subassembly comprising cam plate 82, lower pressure plate 24, bearing 81, and retaining ring 88.

When the clutch is disengaged as shown in FIG. 1, pulley 20 free wheels on input shaft 14 without rotating it. No significant frictional forces are exerted on pucks 54, and pressures plates 22 and 24 are not engaged with pulley 20. Clutch 18 is engaged when clutch arm 100 is rotated in the clockwise direction, either by positive force or by spring force which is applied when linkage connected to a clutch pedal (not shown) is released.

Figure 2:
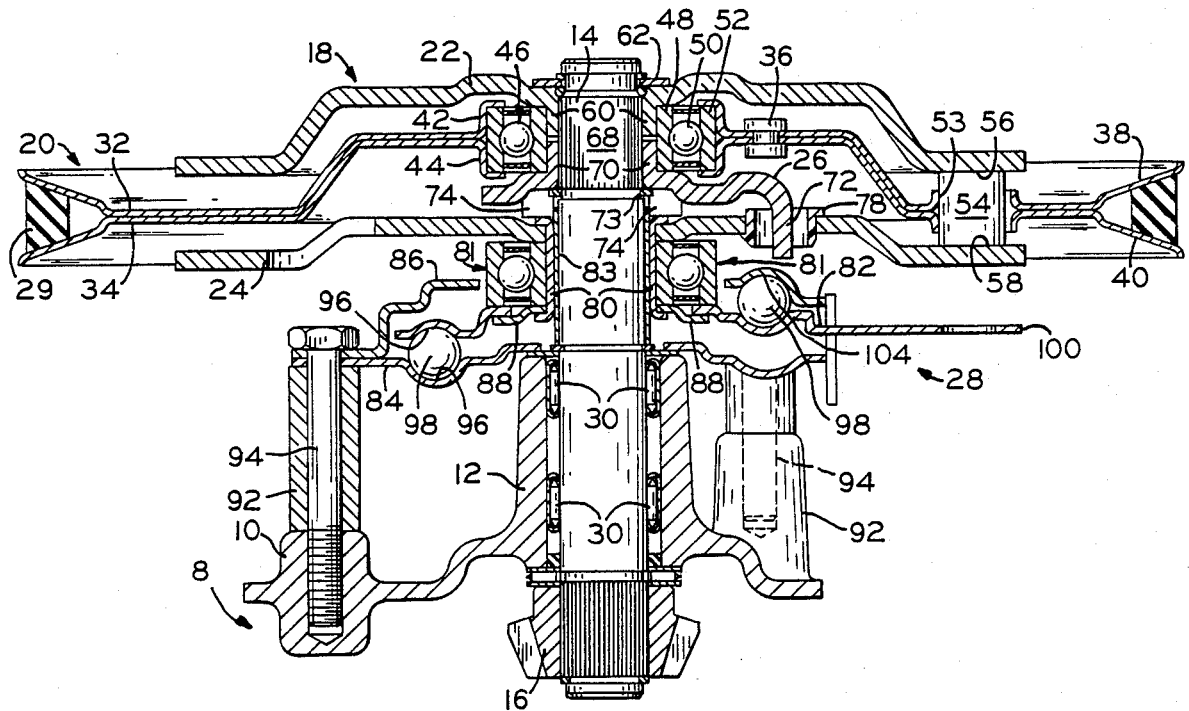
FIG. 2 is a longitudinal sectional view thereof in the engaged position.

When clutch arm 100 rotates in a clockwise direction to the dot-dash position in FIGS. 2 and 3, balls 98 roll into the deep end sections 104 of ramping pockets 96 in upper cam plate 86 as shown in FIG. 2. Simultaneously, balls 98 situated between center cam plate 82 and lower cam plate 84 are forced to roll out of the deep ends 104 of ramping pockets 96 of lower cam plate 84. Rolling balls 98 disposed between the cam plates 82, 84 and 86 cause center cam plate 82 to rise by nearly the height of ball 98.

Because center cam plate 82, bearings 81, retaining ring 88, and lower pressure plate 24 are held together by sleeve 80, when center cam plate 82 axially moves so do all the elements held by retaining sleeve 80, including lower pressure plate 24.

As retaining sleeve 80 slides upwardly on sleeve 83, lower pressure plate 24 also comes in contact with friction pucks 54. Sleeve 83 may be fabricated of a conventional plastic material, which provides a good sliding surface and resistance to corrosion. Friction surfaces 56 of friction pucks 54 engage upper pressure plate 22 and friction surfaces 58 of friction pucks 54 engage lower pressure plate 24. Thus, pulley 20 is rotatably coupled with upper and lower pressure plates 22 and 24. Driver plate 26 and upper pressure plate 22 are fixed to input shaft 14, and therefore transmit the rotational motion of pulley 20 to shaft 14.

To disengage clutch 18 by operation of a lever, pedal, or similar instrument, arm 100 rotates in a counterclockwise direction to the disengaged position of FIG. 1 (FIG. 3). This causes balls 98 located between lower and center cam plates 84 and 82 to roll deeper into ramping pockets 96 of lower cam plate 84 and center cam plate 82. Correspondingly, balls 98 located between center and upper cam plates 82 and 86 roll out of the deeper ends 104 of upper cam plate 86.

This movement of balls 98 causes center cam plate 82 to move away from pulley 20 under the influence of resilient foam pad 74, disengaging upper pressure plate 22 from friction pucks 54. When upper pressure plate 22 disengages from firction pucks 54, the motion of pulley 20 no longer drives input shaft 14.

While this invention has been described as having a preferred design it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. A clutch assembly comprising:
   a shaft;
   a pulley rotatable on said shaft and adapted to be driven by a belt, said pulley located at a substantially fixed axial position on said shaft;
   a first pressure plate axially movable on said shaft,
   a second pressure plate associated with said pulley for selectively frictionally engaging and rotating with said pulley, said second pressure plate fixed on said shaft;
   cam mechanism means on said shaft for axially pressing said first pressure plate into frictional coupling with said pulley and causing frictional coupling between said pulley and said second pressure plate, said cam mechanism means comprising a rotatable center cam plate disposed between an upper and a lower cam plate, each said cam plate having sloping cam surfaces, said cam mechanism means further including a plurality of balls disposed between each adjacent pair of said cam plates and in engagement with said cam surfaces on said cam plates for axially moving said center cam plate when said center cam plate rotates, said center cam plate being operably coupled to said first pressure plate such that said center cam plate moves said first pressure plate into and out of frictional coupling with said pulley as said center cam plate is rotated; and means for selectively rotating said center cam plate.

2. The clutch assembly of claim 1 wherein said center cam plate and said first pressure plate are disposed around and slidable on a corrosionresistant sleeve on said shaft.

3. The clutch assembly of claim 1 wherein said first and second pressure plates are positioned respectively on opposite sides of said pulley.

4. The clutch assembly of claim 3 further comprising a driver plate which includes a flange on its inner circumference about the transmission shaft, said flange providing an annular surface which locates a ball bearing for rotatably supporting said pulley.

5. The clutch assembly of claim 3 wherein said pulley includes a plurality of openings for receiving a plurality of friction pucks having friction surfaces thereon.

6. The clutch assembly of claim 5 wherein said friction pucks comprise upper and lower surfaces, said friction pucks being disposed in said openings such that when said first pressure plate is pressed against said pulley, said upper friction surface adheres to said second pressure plate and said lower friction surface adheres to said first pressure plate.

7. The clutch assembly of claim 1 wherein said center cam plate cam surfaces comprise a plurality of ramping pockets in which said balls are received, said ramping pockets having a deep end and a shallow end such that said balls can roll from said deep end to said shallow end as said center cam plate is rotated in one direction, and roll from said shallow end to said deep end as said center cam plate is rotated in the other direction.

8. The cluch assembly of claim 7 wherein said balls determine the axial position of said center cam plate according to the rotational position of said center cam plate such that in a first rotational position said balls touching said upper cam plate are in said deep ends of said ramping pockets of said center cam plate and said balls touching said lower cam plate are in said shallow ends of said ramping pockets of said center plate, and in a second position said balls touching said upper cam plate are in said shallow ends of said center cam plate and said balls touching said lower cam plates are in said deep ends of said ramping pockets of said center cam plate.

9. A clutch assembly comprising:
a shaft;
a pulley on said shaft adapted to be driven by a belt, said pulley being located at a substantially fixed axial position on said shaft and having a plurality of openings therein;
a pair of pressure plates disposed respectively on both sides of said pulley for engaging and rotating with said pulley, a first said pressure plate being axially movable, and a second said pressure plate being fixed on said shaft;
friction pucks disposed in said openings, said friction pucks having opposite friction surfaces facing said first and second pressure plates respectively for selectively coupling said pulley to said first and second pressure plates; and
selectively actuable means coupled to at least one of said pressure plates for axially pressing said pressure plates into the respective facing friction surfaces to frictionally couple said pressure plates with said pulley.

10. The clutch assembly of claim 9 wherein said friction pucks comprise upper and lower said friction surfaces such that when said first and second pressure plates are coupled to said pulley, said upper friction surface adheres to said second pressure plate and said lower friction surface adheres to said first pressure plate.

11. The clutch assembly of claim 9 further comprising a driver plate which includes a flange on its inner circumference about said shaft, said flange providing an annular surface which locates a ball bearing for rotatably supporting said pulley.

12. The clutch assembly of claim 9 wherein said selectively actuable means comprises a rotatable center cam plate disposed between an upper and a lower cam plate, each said cam plate including sloping cam surfaces, said selectively actuable means having a plurality of balls disposed between each adjacent pair of said cam plates and in engagement with said cam surfaces on said cam plates for axially moving said center cam plate when said center cam plate rotates, said center cam plate being engageable with said second pressure plate such that said center cam plate moves said pressure plates into and out of frictional coupling with said pulley as said center cam plate is rotated, said selectively actuable means including a means for selectively rotating said center cam plate.

13. The clutch assembly of claim 12 wherein said center cam plate and said first pressure plate are disposed around and slidable on a corrosion-resistant sleeve.

14. A clutch assembly comprising:
a shaft;
a pulley located at a substantially fixed axial position on said shaft adapted to be driven by a belt;
first and second pressure plate means disposed respectively on both sides of said pulley for engaging and rotating with said pulley;
said first pressure plate means including a pressure plate fixed to said shaft;
said second pressure plate means including an axially movable plate on said shaft and a driver plate disposed on one side of said pulley, said driver plate fixed to said shaft, said axially movable and driver plates having a means for connecting said driver plate to said axially movable plate such that said axially movable plate rotates in unison with said driver plate yet said axially movable plate is axially movable relative to said driver plate; and
cam means for axially pressing said fixed and movable pressure plates means into frictional engagement with said pulley.

15. The clutch assembly of claim 14 wherein at least one of said pressure plate means includes a flange on its inner circumference about the transmission shaft, said flange providing an annular surface which locates a ball bearing for rotatably supporting said pulley.

16. The clutch assembly of claim 14 wherein said pulley includes a plurality of openings for receiving a plurality of friction pucks having friction surfaces thereon.

17. The clutch assembly of claim 14 wherein said cam means comprises a rotatable center cam plate disposed between an upper and a lower cam plate, each said cam plate having sloping cam surfaces, said cam means further including a plurality of balls disposed between each adjacent pair of said cam plates and in engagement with said cam surfaces on said cam plates for axially moving said center cam plate when it rotates, said center cam plate being engageable with said second pressure plate such that said center cam plate moves said axially movable plate into frictional coupling with said pulley as said center plate is rotated, said cam means further comprising means for selectively rotating said center cam plate.

18. The clutch assembly of claim 14 wherein said center cam plate and said axially movable plate are disposed around and slidable on a corrosion-resistant sleeve.

19. The clutch assembly of claim 14 wherein said connecting means for said axially movable plate and said driver plate comprises a plurality of corrosion resistant grommets located in said axially movable plate and a plurality of arms extending from said driver plate, said arms extending into said grommets such that said axially movable plate causes said driver plate to rotate and allows said axially movable plate to move axially with minimal friction.

20. The clutch assembly of claim 14 wherein said cam means comprises a rotatable and axially movable cam plate connected to said axially movable plate and a plurality of balls located in cam surfaces that, upon rotation of said cam plate, move said cam plate and said axially movable plate in an axial direction selectively to disengage and engage said first and second pressure plate means.

21. The clutch assembly of claim 20 wherein said cam means comprises a sleeve member connecting said cam plate to said pressure axially movable plate.

* * * * *